Jan. 30, 1951   J. BALLENTINE   2,539,686
RUNNER ATTACHMENT FOR BABY CARRIAGES
Filed June 6, 1946
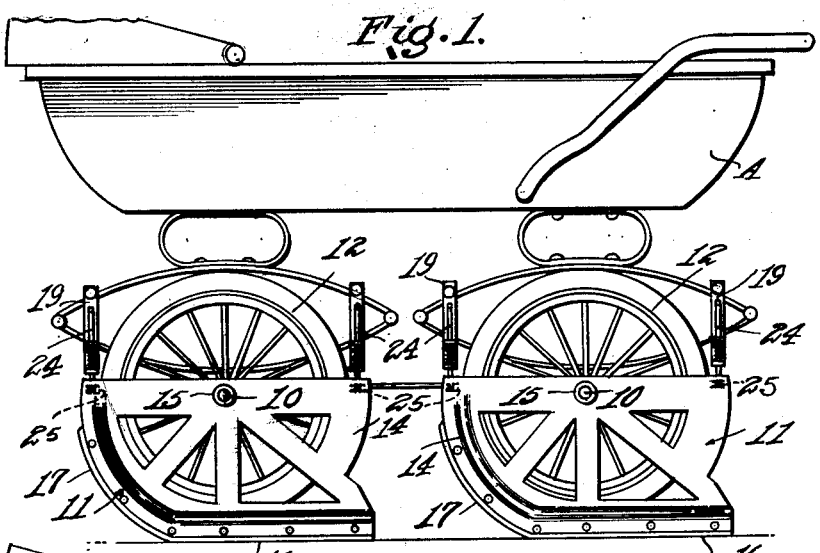
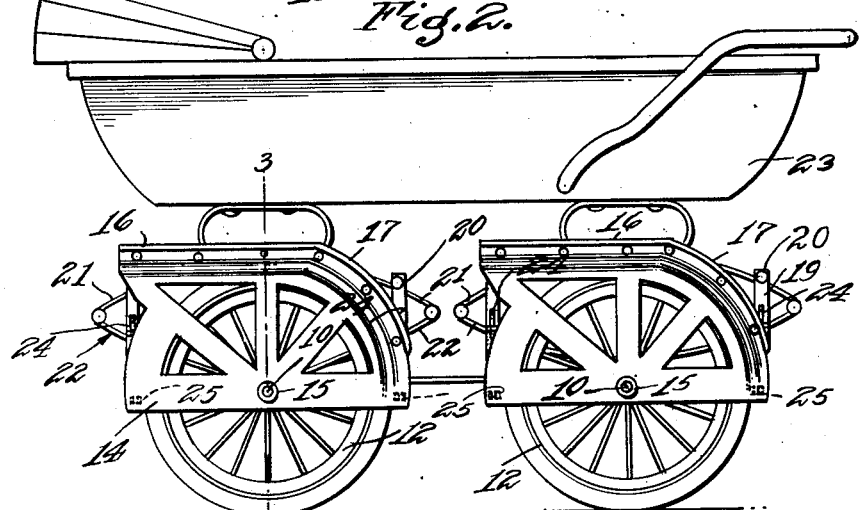
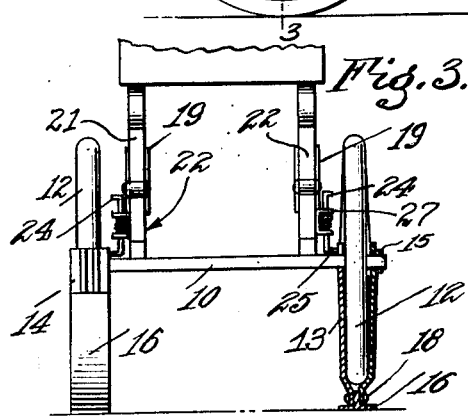
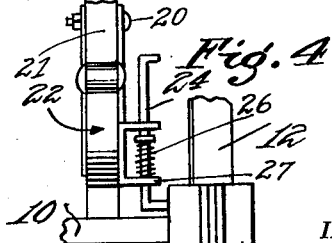
INVENTOR.
John Ballentine.
BY Victor J. Evans & Co.
ATTORNEYS

Patented Jan. 30, 1951

2,539,686

UNITED STATES PATENT OFFICE 2,539,686

RUNNER ATTACHMENT FOR BABY CARRIAGES

John Ballentine, Indianapolis, Ind.

Application June 6, 1946, Serial No. 674,711

1 Claim. (Cl. 280—10)

The invention relates to a runner attachment for hand powered vehicles, and more especially to a skiing attachment for a wagon or baby carriage, cart or the like.

The primary object of the invention is the provision of an attachment of this character, wherein a wheeled vehicle can be converted into a sled or ski vehicle with ease and dispatch, thus making the vehicle serviceable for winter use, in addition to the ordinary use thereof, as the occasion may require.

Another object of the invention is the provision of an attachment of this character, wherein the vehicle on the converting thereof can be moved over snow and frozen surfaces, the attachment being of novel construction and unique in the assembly of its parts, so that the said vehicle can be changed without the removal of its wheels or in any manner altering the structural normal make-up of the same.

A further object of the invention is the provision of an attachment of this character, wherein the same becomes a permanent part of the vehicle, so that the latter wears the said attachment at all times, and when not in use is effective as fenders to the wheels of such vehicle during its service in inclement weather.

A still further object of the invention is the provision of an attachment of this character, which is simple in construction, thoroughly reliable and efficient in operation, strong, durable, readily and easily adjusted, neat in appearance, possessed of few parts, thus economical in repairs and replacements, compact, and inexpensive to manufacture and install.

With these and other objects in view the invention consists in the features of construction, combination and arrangement of parts as will be hereinafter more fully described, illustrated in the accompanying drawing, which discloses the preferred embodiment of the invention, and pointed out in the claim hereunto appended.

In the accompanying drawing:

Figure 1 is a side elevation of a vehicle, showing the attachment constructed in accordance with the invention applied, converting the vehicle into a sled.

Figure 2 is a view similar to Figure 1 showing the vehicle with the attachment adjusted for the use as a wheeled vehicle.

Figure 3 is a partial sectional view taken on the line 3—3 of Figure 2.

Figure 4 is a fragmentary rear end elevation of the vehicle with the attachment shown in the position in Figure 1.

Similar reference characters indicate corresponding parts throughout the several views in the drawing.

Referring to the drawing in detail, A designates generally a wheeled vehicle, in this instance, of a baby carriage type, yet it may be of a wagon or any other type, while on the running gear axles 10, there are fitted the attachments constituting the present invention, as hereinafter described. Each attachment, constituting the present invention, comprises a substantially half circular shaped guard frame 11 forming a fender which extends over both the inside and outside areas of the vehicle wheel 12. This frame 11 at its inside and outside walls 13 and 14, respectively, and at the transverse center axis of the same has a hub fitting 15 secured to the axle 10. The frame 11 can swing or rotate about the upper or lower half-portion of the wheel 12, the frame 11 being of greater diameter than the wheel, and in this manner one-half of the wheel will be housed and the frame 11 will serve as a fender for the wheel under adjusted conditions of the frame.

The frame 11 at the perimeter thereof is fitted with a runner 16, which at the fore part thereto is formed with a curved toe end 17 following the curvature of the wheel 12, the runner being detachably secured to the frame by any suitable means, such as bolts or rivets 18. The runners 16 are designed for travel on snow and icy surfaces, when the attachment unit is adjusted for such service on the vehicle A, and this position or adjustment of the unit is shown in Figures 1 and 3 of the drawing. In Figure 2 of the drawing, the unit is adjusted for the use of the vehicle A for the ground travel of the wheels 12 thereof.

Next to each frame 11 and adjacent to opposite ends of the inner wall 13 thereof, are vertically disposed hanger brackets 19, each suitably secured as at 20 to the upper leaves 21 of a bowed leaf spring 22 for the body 23 of the vehicle A, the axle 10 being carried by the said spring 22. On each bracket 19 is releasably mounted a spring latch 24, hand operated or controlled, and adapted for latching engagement with the frame 11, so that it can be locked in the two positions, under adjustment thereof, as disclosed in Figures 1 and 2 of the drawing, the latch 24 being engageable in a slot 25 therefor provided on the frame 11 when in latching condition. Due to the inherent "give" or spring of each frame 11, it may be rotated into either of its positions until the ends of the latches 24 project into their respective openings 25. To unlatch the frames, each end is bodily sprung slightly away from the respective latch to disengage it from its opening to permit the frame to be moved into its other position. A coil spring 26 serves to normally maintain the latch 24 in engagement with the slot 24 in the frame 11, the latch 24 being slidably arranged in a U-shaped body member 27.

When the frame 11 is worn in a raised position on the vehicle A it serves as a fender for its wheel 12, while the latter travels on the ground, then when the frame 11 is turned to a lowered position the runner 16 can travel on snow or upon icy surfaces, thus the vehicle A being converted from a wheel traveling to a sled or ski traveling vehicle, as should be clearly apparent, the frame 11 being latched secure in these two positions and is permanently worn by the vehicle.

What is claimed is:

In combination, a baby carriage having forward and rear axles with wheels journaled thereon, a body member and leaf springs connecting the body member to the axles, sled runner attachments for each of the wheels, each attachment comprising side frames adapted to be extended respectively along the inner and outer sides of each wheel, a runner connected between the side frames, said side frames having hub portions journaled on the axles to permit the attachment to be adjusted to either lowered or raised position, brackets, latch means on said brackets adapted to engage a respective inner side frame to hold the same in either its lowered or raised positions, there being two brackets for each frame and means mounting said brackets on the leaf springs.

JOHN BALLENTINE.

REFERENCES CITED

The following references are of record in the file of this patent:

UNITED STATES PATENTS

| Number | Name | Date |
|---|---|---|
| 1,291,229 | Stevenor, Jr. | Jan. 14, 1919 |

FOREIGN PATENTS

| Number | Country | Date |
|---|---|---|
| 39,076 | Sweden | July 7, 1915 |